United States Patent
Seo

(10) Patent No.: US 9,756,623 B2
(45) Date of Patent: Sep. 5, 2017

(54) METHOD AND APPARATUS FOR RECEIVING DOWNLINK SIGNAL IN WIRELESS COMMUNICATION SYSTEM

(71) Applicant: LG ELECTRONICS INC., Seoul (KR)

(72) Inventor: Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/425,248

(22) PCT Filed: Sep. 13, 2013

(86) PCT No.: PCT/KR2013/008295
§ 371 (c)(1),
(2) Date: Mar. 2, 2015

(87) PCT Pub. No.: WO2014/042456
PCT Pub. Date: Mar. 20, 2014

(65) Prior Publication Data
US 2015/0237603 A1    Aug. 20, 2015

Related U.S. Application Data

(60) Provisional application No. 61/702,237, filed on Sep. 17, 2012.

(51) Int. Cl.
*H04W 4/00*       (2009.01)
*H04W 72/04*      (2009.01)
(Continued)

(52) U.S. Cl.
CPC ......... *H04W 72/042* (2013.01); *H04L 1/0038* (2013.01); *H04L 1/0046* (2013.01); *H04L 5/0023* (2013.01)

(58) Field of Classification Search
CPC .. H04W 72/04; H04W 72/042; H04L 5/0023; H04L 1/0036; H04L 1/0038; H04L 1/0046
See application file for complete search history.

(56) References Cited

U.S. PATENT DOCUMENTS

2009/0168922 A1    7/2009  Malladi et al.
2011/0228731 A1*   9/2011  Luo ..................... H01Q 3/2605
                                                    370/329
(Continued)

FOREIGN PATENT DOCUMENTS

KR    10-2011-0120498 A    11/2011
KR    10-2011-0138073 A    12/2011
(Continued)

OTHER PUBLICATIONS

Ericsson et al., "Antenna ports for ePDCCH," 3GPP TSG-RAN WG1 #69, Prague, Czech Republic, May 21-25, 2012, 4 pages, R1-121997, XP50600289.
(Continued)

*Primary Examiner* — Kevin Mew
(74) *Attorney, Agent, or Firm* — Birch, Stewart, Kolasch & Birch, LLP

(57) ABSTRACT

The present invention relates to a method by which a terminal receives a downlink signal through an enhanced physical downlink control channel (EPDCCH) in a wireless communication system. The method includes the steps of: receiving one or more EPDCCH physical resource block (PRB) sets; and blind decoding EPDCCH candidates for each set level from among the one or more EPDCCH PRB sets, wherein one or more of EPDCCH candidate indexes and EPDCCH PRB indexes are used for determining an antenna port related to the EPDCCH candidates.

14 Claims, 9 Drawing Sheets

(51) Int. Cl.
*H04L 5/00* (2006.01)
*H04L 1/00* (2006.01)

(56) References Cited

U.S. PATENT DOCUMENTS

| | | | |
|---|---|---|---|
| 2011/0268062 A1 | 11/2011 | Ji et al. | |
| 2011/0310829 A1 | 12/2011 | Ji et al. | |
| 2013/0021989 A1* | 1/2013 | Tiirola | H04L 5/0053 370/329 |
| 2013/0039284 A1* | 2/2013 | Marinier | H04L 5/001 370/329 |
| 2013/0044664 A1* | 2/2013 | Nory | H04L 1/0045 370/311 |
| 2013/0044727 A1* | 2/2013 | Nory | H04L 5/0092 370/330 |
| 2013/0064216 A1* | 3/2013 | Gao | H04L 5/0016 370/330 |
| 2013/0107822 A1* | 5/2013 | Papasakellariou | H04W 72/04 370/329 |
| 2013/0114529 A1* | 5/2013 | Chen | H04L 1/1812 370/329 |
| 2013/0194931 A1* | 8/2013 | Lee | H04L 5/0053 370/241 |
| 2013/0195020 A1* | 8/2013 | Frederiksen | H04W 72/042 370/329 |
| 2013/0215842 A1* | 8/2013 | Han | H04W 72/042 370/329 |
| 2013/0242886 A1* | 9/2013 | Chen | H04L 5/1469 370/329 |
| 2013/0301542 A1* | 11/2013 | Krishnamurthy | H04W 52/50 370/329 |
| 2013/0301561 A1* | 11/2013 | Sartori | H04W 72/04 370/329 |
| 2013/0301562 A1* | 11/2013 | Liao | H04W 72/042 370/329 |
| 2014/0003349 A1 | 1/2014 | Kang et al. | |
| 2014/0003375 A1* | 1/2014 | Nam | H04W 72/0406 370/329 |
| 2014/0036810 A1* | 2/2014 | Harrison | H04W 72/042 370/329 |
| 2014/0071918 A1* | 3/2014 | Park | H04W 72/14 370/329 |
| 2014/0328312 A1* | 11/2014 | Seo | H04L 1/1861 370/329 |
| 2015/0085779 A1* | 3/2015 | Seo | H04J 11/00 370/329 |
| 2015/0092690 A1* | 4/2015 | Seo | H04W 72/042 370/329 |
| 2015/0237607 A1* | 8/2015 | Frederiksen | H04L 5/0053 370/329 |
| 2015/0373739 A1* | 12/2015 | Seo | H04W 72/04 370/329 |

FOREIGN PATENT DOCUMENTS

| | | |
|---|---|---|
| WO | WO 2012/109542 A1 | 8/2012 |
| WO | WO 2012/118270 A1 | 9/2012 |

OTHER PUBLICATIONS

Huawei et al., "Antenna port association for ePDCCH," 3GPP TSG RAN WG1 Meeting #69, Prague, Czech Republic, May 21-25, 2012, 5 pages, R1-121958, XP50600259.

LG Electronics, "Discussions on the association between antenna ports and ePDCCH," 3GPP TSG RAN WG1 Meeting #69, Prague, Czech Republic, May 21-25, 2012, pp. 1-6, R1-122304, XP50600567.

\* cited by examiner

FIG. 6
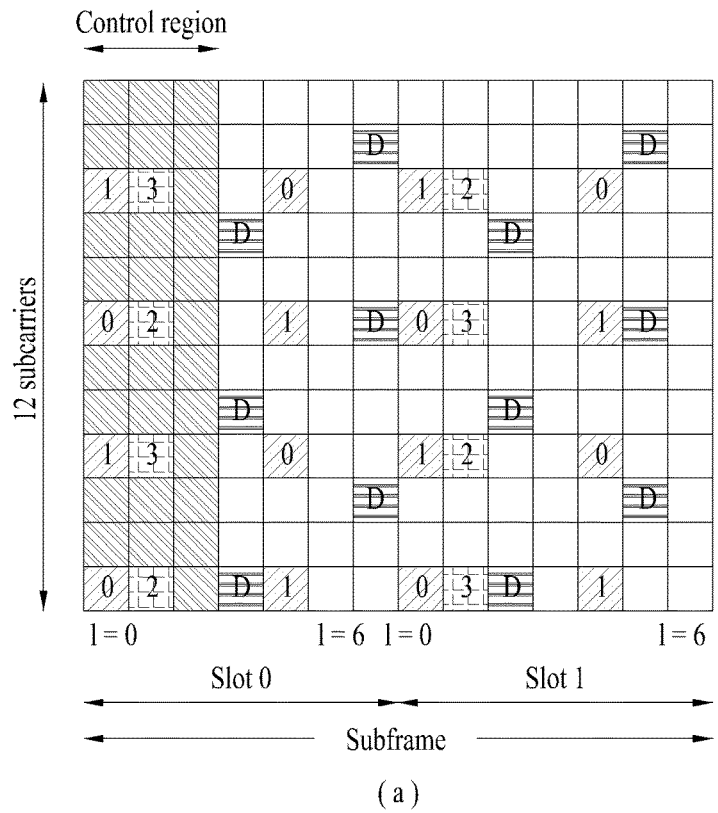
(a)
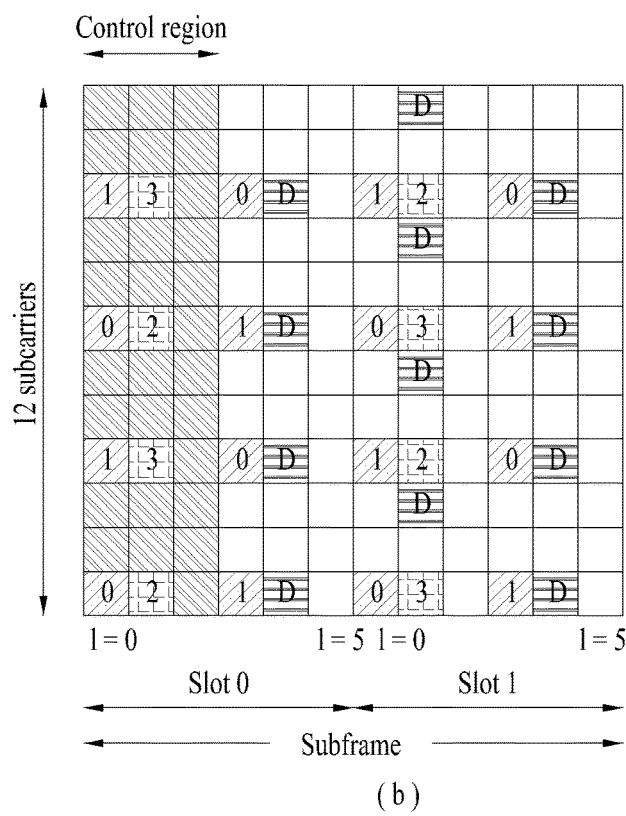
(b)

FIG. 7
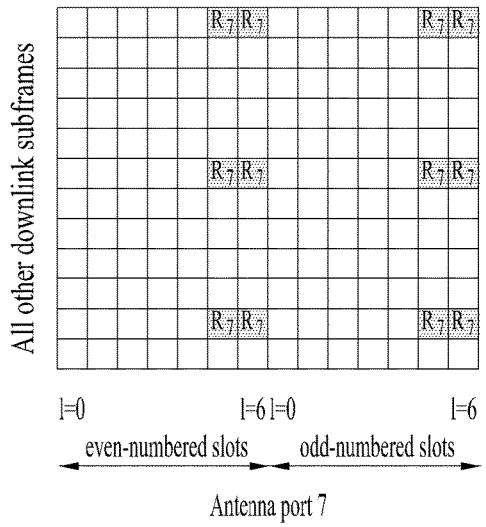
Antenna port 7
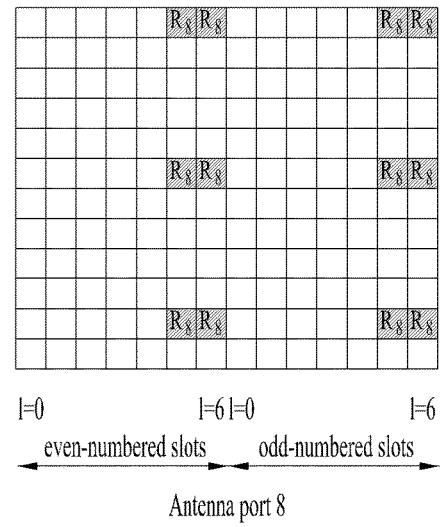
Antenna port 8
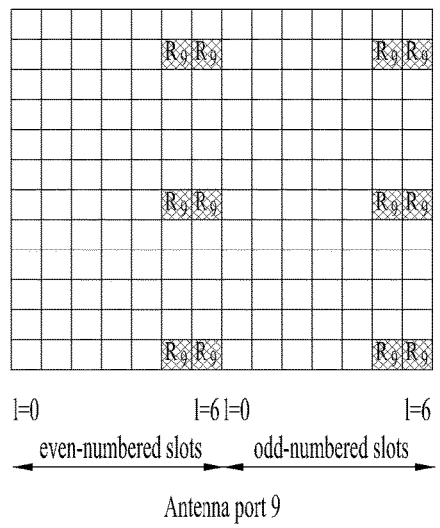
Antenna port 9
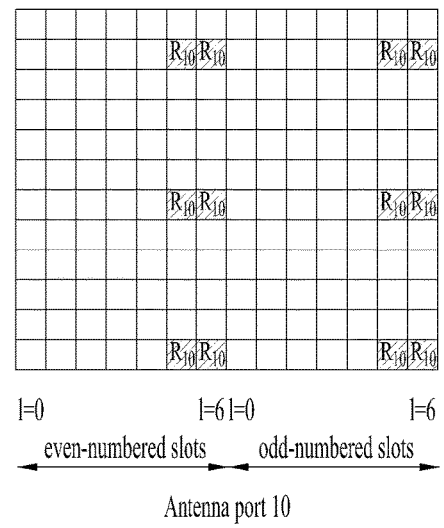
Antenna port 10

METHOD AND APPARATUS FOR RECEIVING DOWNLINK SIGNAL IN WIRELESS COMMUNICATION SYSTEM

CROSS REFERENCE TO RELATED APPLICATIONS

This application is the National Phase of PCT International Application No. PCT/KR2013/008295, filed on Sep. 13, 2013, which claims priority under 35 U.S.C. 119(e) to U.S. Provisional Application No. 61/702,237, filed on Sep. 17, 2012, all of which are hereby expressly incorporated by reference into the present application.

TECHNICAL FIELD

The present invention relates to a wireless communication system, and more particularly to a method and apparatus for receiving control information through an enhanced physical downlink channel (EPDCCH).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide the operations achieved when two or more EPDCCH candidates are allocated to the same resource while a user equipment (UE) performs blind decoding for EPDCCH.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a downlink signal through an Enhanced Physical Downlink Control Channel (EPDCCH) in a wireless communication system by a user equipment (UE) including: receiving one or more EPDCCH PRB (Physical Resource Block) set; and performing blind decoding of an EPDCCH candidate for each aggregation level in the one or more EPDCCH PRB set, wherein at least one of an EPDCCH candidate index and an EPDCCH PRB set index is used to determine an antenna port related to the EPDCCH candidate.

In accordance with another aspect of the present invention, a user equipment (UE) device for receiving a downlink signal through an Enhanced Physical Downlink Control Channel (EPDCCH) in a wireless communication system by a user equipment (UE) includes: a reception (Rx) module; and a processor, wherein the processor receives one or more EPDCCH PRB (Physical Resource Block) set, and performs blind decoding of an EPDCCH candidate for each aggregation level in the one or more EPDCCH PRB set, where at least one of an EPDCCH candidate index and an EPDCCH PRB set index is used to determine an antenna port related to the EPDCCH candidate.

The first and second technical aspects may include the following items.

The one or more EPDCCH PRB set may include a localized EPDCCH PRB set.

The lowest ECCE index of the EPDCCH candidate, a user equipment identifier (UE ID), and the number of ECCEs for each resource block may be used to determine the antenna port related to the EPDCCH candidate.

The antenna port related to the EPDCCH candidate may be decided by any one of the following equations, $$n' = (n_{ECCE,low} + idx_{set}) \bmod N_{ECCE}^{RB} + n_{RNTI} \bmod \min(N_{ECCE}^{EPDCCH}, N_{ECCE}^{RB})$$

$$n' = n_{ECCE,low} \bmod N_{ECCE}^{RB} + (n_{RNTI} + idx_{set}) \bmod \min(N_{ECCE}^{EPDCCH}, N_{ECCE}^{RB})$$

$$n' = (n_{ECCE,low} + idx_{set}) \bmod N_{ECCE}^{RB} + (n_{RNTI} + idx_{set}) \bmod \min(N_{ECCE}^{EPDCCH}, N_{ECCE}^{RB}) \quad \text{[Equations]}$$

where, n' is a value for indicating the antenna port, $n_{ECCE,low}$ is the lowest ECCE index from among ECCEs constructing the EPDCCH candidate contained in an EPDCCH set, $n_{RNTI}$ is a user equipment identifier (UE ID), $N_{ECCE}^{RB}$ is the number of ECCEs per resource block, $N_{ECCE}^{EPDCCH}$ is an aggregation level, and $idx_{set}$ is the EPDCCH PRB set index.

The antenna port related to the EPDCCH candidate may be decided by any one of the following equations, $$n' = (n_{ECCE,low} + idx_{can}) \bmod N_{ECCE}^{RB} + n_{RNTI} \bmod \min(N_{ECCE}^{EPDCCH}, N_{ECCE}^{RB})$$

$$n' = n_{ECCE,low} \bmod N_{ECCE}^{RB} + (N_{RNTI} + idx_{can}) \bmod \min(N_{ECCE}^{EPDCCH}, N_{ECCE}^{RB})$$

$$n' = (n_{ECCE,low} + idx_{can}) \bmod N_{ECCE}^{RB} + (n_{RNTI} + idx_{can}) \bmod \min(N_{ECCE}^{EPDCCH}, N_{ECCE}^{RB}) \quad \text{[Equations]}$$

where, n' is a value for indicating the antenna port, $n_{ECCE,low}$ is the lowest ECCE index from among ECCEs constructing the EPDCCH candidate contained in an EPDCCH set, $n_{RNTI}$ is a user equipment identifier (UE ID), $N_{ECCE}^{RB}$ is the number of ECCEs per resource block, $N_{ECCE}^{EPDCCH}$ is an aggregation level, and $idx_{can}$ is the EPDCCH candidate index.

The antenna port related to the EPDCCH candidate may be decided by any one of the following equations, $$n' = (n_{ECCE,low} + idx_{set} + idx_{can}) \bmod N_{ECCE}^{RB} + n_{RNTI} \bmod \min(N_{ECCE}^{EPDCCH}, N_{ECCE}^{RB})$$

$$n' = n_{ECCE,low} \bmod N_{ECCE}^{RB} + (n_{RNTI} + idx_{set} + idx_{can}) \bmod \min(N_{ECCE}^{EPDCCH}, N_{ECCE}^{RB})$$

$$n' = (n_{ECCE,low} + idx_{set} + idx_{can}) \bmod N_{ECCE}^{RB} + (n_{RNTI} + idx_{set} + idx_{can}) \bmod \min(N_{ECCE}^{EPDCCH}, N_{ECCE}^{RB}) \quad \text{[Equations]}$$

where, n' is a value for indicating the antenna port, $n_{ECCE,low}$ is the lowest ECCE index from among ECCEs constructing the EPDCCH candidate contained in an EPDCCH set, $n_{RNTI}$ is a user equipment identifier (UE ID), $N_{ECCE}^{RB}$ is the number of ECCEs per resource block, $N_{ECCE}^{EPDCCH}$ is an aggregation level, $idx_{can}$ EPDCCH candidate index, and $idx_{set}$ is the EPDCCH PRB set index.

If n' is 0, 1, 2, or 3, n'=0 may indicate an antenna port #107, n'=1 may indicate an antenna port #108, n'=2 may indicate an antenna port #109, or n'=3 may indicate an antenna port #110.

The number of antenna ports related to the EPDCCH candidate may be set to 1, irrespective of an aggregation level.

The EPDCCH candidate index or the EPDCCH PRB set index may not correspond to a multiple of the aggregation level.

If the EPDCCH candidate index or the EPDCCH PRB set index is a multiple of the aggregation level, and if at least two EPDCCH candidates correspond to one antenna port, antenna ports related to the at least two EPDCCH candidates may be differently determined.

The antenna port related to the at least two EPDCCH candidates may be determined to be an antenna port allocated to an ECCE in order of ECCE indexes corresponding to the EPDCCH candidates.

The one or more EPDCCH PRB set may be indicated through higher layer signaling.

Advantageous Effects

As is apparent from the above description, the embodiments of the present invention can differently allocate a representative antenna port although two or more EPDCCH candidates are allocated to the same resource, so that the number of blind decoding (BD) times of a user equipment (UE) can be guaranteed.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 6 is a conceptual diagram illustrating a reference signal (RS).

FIG. 7 is a conceptual diagram illustrating a demodulation reference signal (DMRS).

BEST MODE

Figure 1:
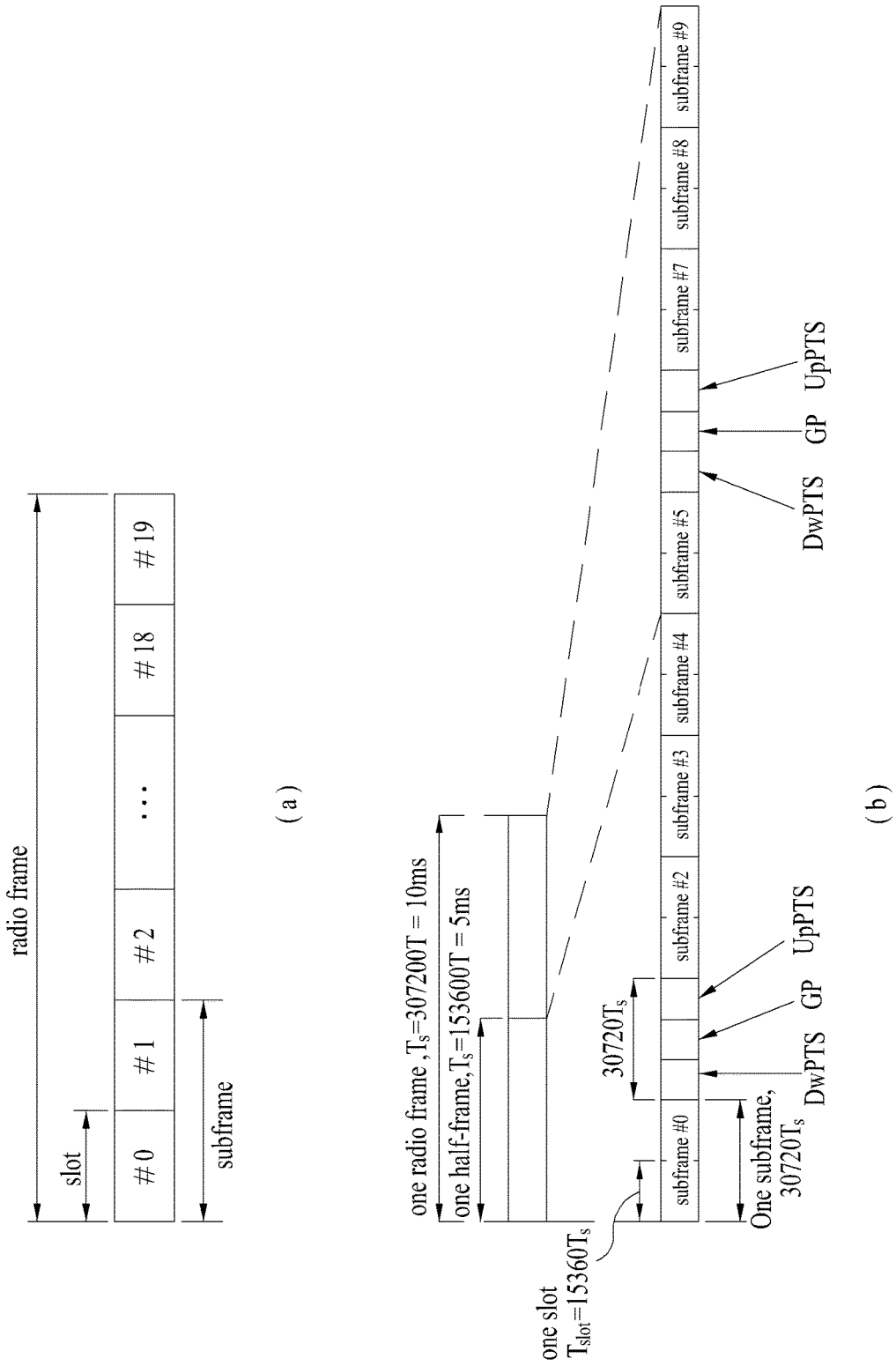
FIG. 1 exemplarily shows a radio frame structure.

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CR For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDCCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
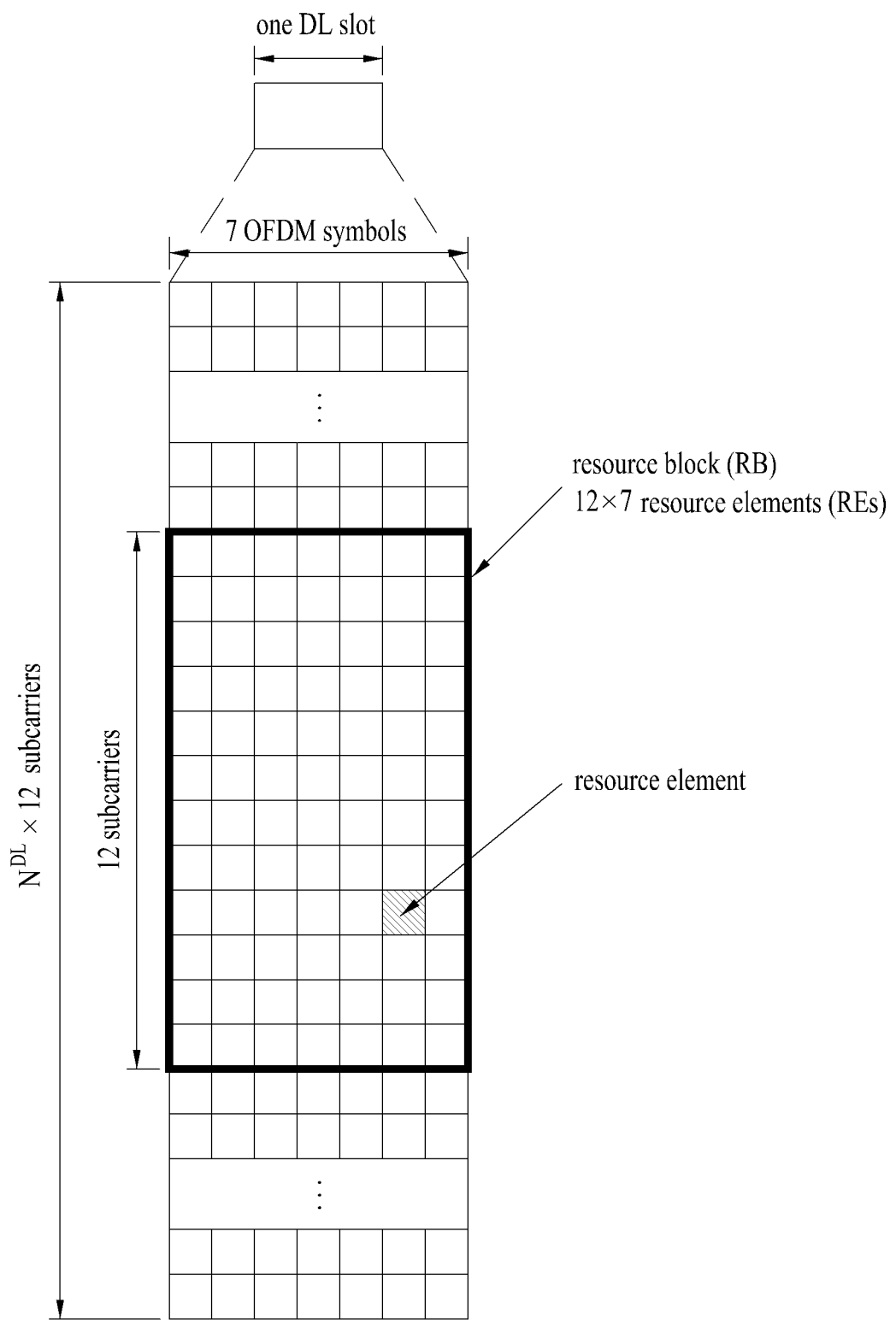
FIG. 2 exemplarily shows a resource grid of a downlink slot.

FIG. 2 is a diagram illustrating a resource grid of one DL slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12×7 REs. The number $N^{DL}$ of RBs included in a DL slot depends on a DL transmission bandwidth. A UL slot may have the same structure as the DL slot.

Figure 3:
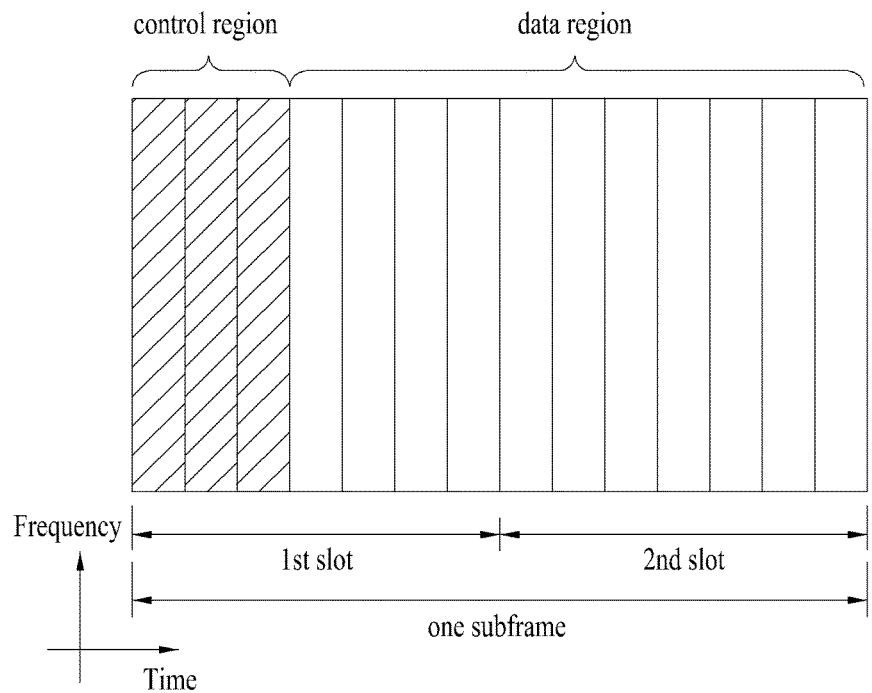
FIG. 3 exemplarily shows a downlink subframe structure.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
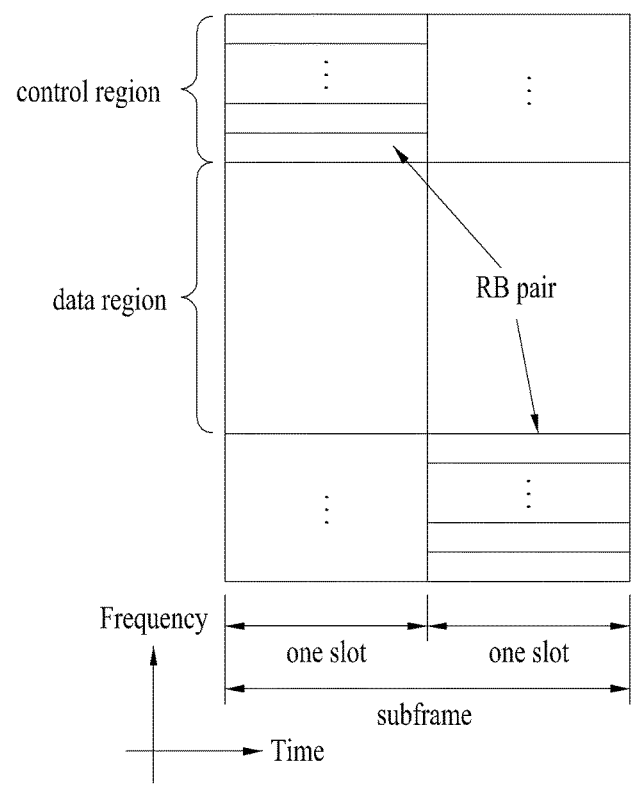
FIG. 4 exemplarily shows an uplink subframe structure.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots, This is called frequency hopping of the RB pair allocated to the PUCCH over a slot boundary.

DCI Format

Currently, DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. According to purposes of control information to be transmitted, the DCI formats may be divided into i) DCI formats 0 and 4, which are used for uplink grant, ii) DCI formats 1, 1A, 1B, 1C, 1D, 2, 2A, 2B and 2C, which are used for downlink scheduling allocation, and iii) DCI formats 3 and 3A, which are for power control commands.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is a new format added to LTE-A Release 10, supports application of spatial multiplexing to uplink transmission in LTE-A. DCI format 4 has a larger message size than DCI format 0 since it further includes information for spatial multiplexing. DCI format 4 includes additional control information in addition to the control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A as it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation, but includes neither a carrier indicator nor a redundancy version, compared to the other formats.

DCI format 1A is intended for downlink scheduling and random access. DCI format 1A may include a carrier indicator, an indicator for indicating whether or not downlink distributed transmission is used, PDSCH resource allocation information, a modulation and coding scheme, a redundancy version, a HARQ processor number for indicating, a processor used for soft combining, a new data indicator used to empty a buffer to implement initial transmission in relation to a HARQ process, a TPC command, for a PUCCH, and an uplink index necessary for TDD operation.

DCI format 1 includes control information similar to that of DCI format 1A. DCI format 1 supports non-contiguous resource allocation, whereas DCI format 1A is related to contiguous resource allocation. Accordingly, DCI format 1 further includes a resource allocation header, and thus slightly increases control signaling overhead as a trade-off for increase in flexibility of resource allocation.

Both DCI formats 1B and 1D further include precoding information, compared to DCI format 1. DCI format 1B includes PMI acknowledgement, and DCI format 1D includes downlink power offset information. Most control information included in DCI formats 1B and 1D corresponds to that of DCI format 1A.

DCI formats 2, 2A, 2B and 2C basically include most of the control information included in DCI format 1A and further include information for spatial multiplexing. In this embodiment, the information for spatial multiplexing corresponds to a modulation and coding scheme for the second transmission block, a new data indicator, and a redundancy version DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamfonning and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, and a 2-bit command is used per UE in the case of DCI format 3A.

One of the DCI formats described above is transmitted over a PDCCH, and a plurality of PDCCHs may be transmitted in the control region. A UE may monitor the plurality of PDCCHs.

PDCCH Processing

Control channel elements (CCEs), which are contiguous logical allocation units, are used in mapping a PDCCH to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH, it is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is a set of candidate PDCCHs composed of CCEs which the UE needs to attempt to decode at an aggregation level. Each aggregation level and the corresponding number of candidate PDCCHs may be defined as shown in Table 2.

TABLE 2

| | Search space | | |
|---|---|---|---|
| | Aggregation level | Size (in CCE units) | Number of PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, there are 4 aggregation levels, and the UE has a plurality of search spaces according to the aggregation levels. The search spaces may be divided into a UE-specific search space (USS) and a common search space (CSS), as shown in Table 2. The UE-specific search space is for specific UEs. Each UE may check an RNTI and CRC with which the PDCCH is masked, by monitoring the UE-specific search space thereof (attempting to decode a PDCCH candidate set according to a possible DCI format) and acquire control information if the RNTI and CRC are valid.

The CSS is intended for use in the case in which a plurality of UEs or all UEs need to receive PDCCHs, as in the cases of system information dynamic scheduling and paging messages. The CSS may be used for a specific UE in terms of resource management. Furthermore, the CSS may overlap the USS.

Specifically, the search space may be determined by Equation 1 given below.

$$L\left\{(Y_k + m') \bmod \left\lfloor \frac{N_{CCE,k}}{L} \right\rfloor \right\} + i \quad \text{Equation 1}$$

Here, L denotes an aggregation level, $Y_k$ is a variable determined by an RNTI and subframe number k, and m' is the number of PDCCH candidates. If carrier aggregation is applied, otherwise, m'=m. Herein, $m^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, . . . , L−1. For the CSS, $Y_k$ is always determined to be 0.

Figure 5:
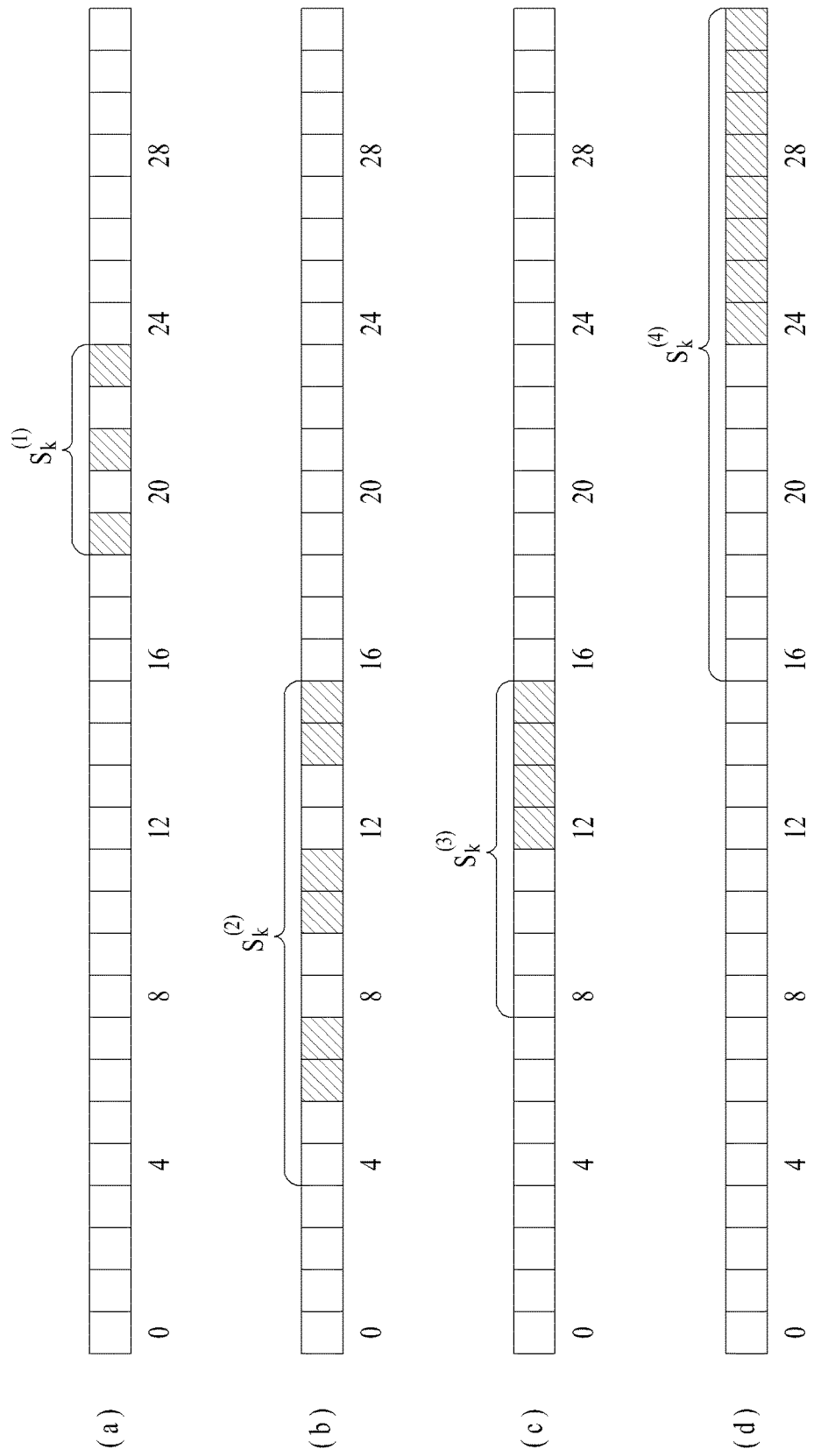
FIG. 5 is a conceptual diagram illustrating a search space.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined for a UE at the respective aggregation levels in the same subframe according to the modulo function and L. The start CCE is always determined to correspond to a multiple of the corresponding aggregation level due to L. In the description given below, $Y_k$ is exemplarily assumed to be CCE number 18. The UE attempts to sequentially decode the CCEs starting with the start CCE in units of CCEs determined for a corresponding aggregation level. In FIG. 5(b), for example, The UE attempts to decode the CCEs two by two, starting with CCE 4, which is the start CCE, according to the aggregation level.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times in the CSS, in consideration of two DCI sizes (DCI formats 0/1A/3/3A and DCI format 1C) for each of six PDCCH candidates. In the USS, the UE needs to attempt to perform decoding up to 32 times, in consideration of two DCI sizes for each of 16 (6+6+2+2=16) PDCCH candidates. Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) allowing the BS to measure UL channel quality at frequencies for different networks.

The DL RSs include:

i) a cell-specific reference signal (CRS) shared by all UEs in a cell;
ii) a UE-specific reference signal for a specific UE;
iii) a demodulation-reference signal (DM-RS) transmitted for coherent demodulation in the case of transmission of a PDSCH;
iv) a channel state information-reference signal (CSI-RS) for delivering channel state information (CSI) in the case of transmission of a DL DMRS;
v) a multimedia broadcast single frequency network (MB-SFN) reference signal transmitted for coherent demodulation of a signal transmitted in an MBSFN mode, and
vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes of acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 6 is a diagram illustrating a pattern in which CRSs and DRSs defined in legacy 3GPP LTE (e.g., Release-8) are mapped to resource block (RB) pairs. A downlink RB pair, a unit in which an RS is mapped, may be represented as a unit of one subframe in the time domain times 12 subcarriers in the frequency domain. That is, one RB pair has a length of 14 OFDM symbols for a normal CP (FIG. 6($a$)) and a length of 12 OFDM symbols for an extended CP (FIG. 6($b$)).

FIG. 6 shows locations of RSs on RB pairs in a system with a BS supporting four transmit antennas. In FIG. 6, resource elements (REs) marked "0", "1", "2" and "3" represent the locations of the CRSs for antenna port indexes 0, 1, 2 and 3, respectively. In FIG. 6, REs denoted by "D" represent locations of the DMRSs.

DeModulation Reference Signal (DMRS)

DMRS is a reference signal that is defined by a UE to implement channel estimation for PDSCH. DMRS may be used in Tx ports 7, 8, and 9. In the initial stages, although DMRS has been defined for transmission of a single layer corresponding to an antenna port 5, the DMRS has been extended for spatial multiplexing of a maximum of 8 layers. DMRS is transmitted only for a single specific UE as can be seen from a UE-specific reference signal (RS) corresponding to a different name of DMRS. Accordingly, DMRS can be transmitted only in an RB in which PDSCH for the specific UE is transmitted.

DMRS generation for a maximum of 8 layers will hereinafter be described in detail. In case of DMRS, a reference signal sequence r(m) generated by Equation 2 may be mapped to a complex-valued modulation symbols $a_{k,l}^{(p)}$ obtained by Equation 3. FIG. 7 shows that DMRS is mapped to a resource grid of a subframe in case of a general CP, and relates to antenna ports 7 to 10.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

[Equation 2]

In Equation 2, r(m) is a reference signal sequence, c(i) is a pseudo-random sequence, and $N_{RB}^{max,DL}$ is a maximum number of RBs of a downlink bandwidth.

[Equation 3]

$$a_{k,l}^{(p)} = w_p(l') \cdot r(3 \cdot l' \cdot N_{RB}^{max,DL} + 3 \cdot n_{PRB} + m')$$

$$w_p(i) = \begin{cases} \overline{w}_p(i) & (m' + n_{PRB})\mod 2 = 0 \\ \overline{w}_p(3-i) & (m' + n_{PRB})\mod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\mod 2 + 2 & \text{Case of special subframe configurations 3, 4, 8, 9} \\ l'\mod 2 + 2 + 3\lfloor l'/2 \rfloor & \text{Case of special subframe configurations 1, 2, 6, 7} \\ l'\mod 2 + 5 & \text{Case in which special subframe is not given} \end{cases}$$

$$l' = \begin{cases} 0, 1, 2, 3 & n_s\mod 2 = 0, \text{ Case of special subframe configurations 1, 2, 6, 7} \\ 0, 1 & N_s\mod 2 = 0, \text{ Case in which special subframe configurations 1, 2, 6, 7 are not given} \\ 2, 3 & n_s\mod 2 = 1, \text{ Case in which special subframe configurations 1, 2, 6, 7 are not given} \end{cases}$$

$$m' = 0, 1, 2$$

As can be seen from Equation 3, an orthogonal sequence $\overline{w}_p(i)$ shown in the following Table 3 is applied to the reference signal sequence r(m) when r(m) is mapped to a complex modulation symbol.

TABLE 3

| Antenna port $p$ | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

DMRS may perform channel estimation in different ways according to a spreading factor of 2 or 4. Referring to Table 1, an orthogonal sequence is repeated in the form of [a b a b] at antenna ports 7 to 10, such that the spreading factor is set to 2 at antenna ports 7~10 and the spreading factor is set to 4 at antenna ports 11~14. If the spreading factor is set to 2, a UE may despread each of a DMRS of a first slot and a DMRS of a second slot to the spreading factor of 2, and then perform channel estimation through time interpolation. If the spreading factor is set to 4, DMRS of the entire subframe is despread to the spreading factor of 4 at one time, such that channel estimation can be performed.

In the case of using the spreading factor of 2, the spreading-factor based channel estimation scheme may acquire not only a gain obtained because time interpolation is applied at high mobility, but also a gain of a decoding time because despreading to DMRS of the first slot is possible. In case of using the spreading factor of 4, the spreading-factor based channel estimation scheme can also support many more UEs or ranks.

Figure 8:
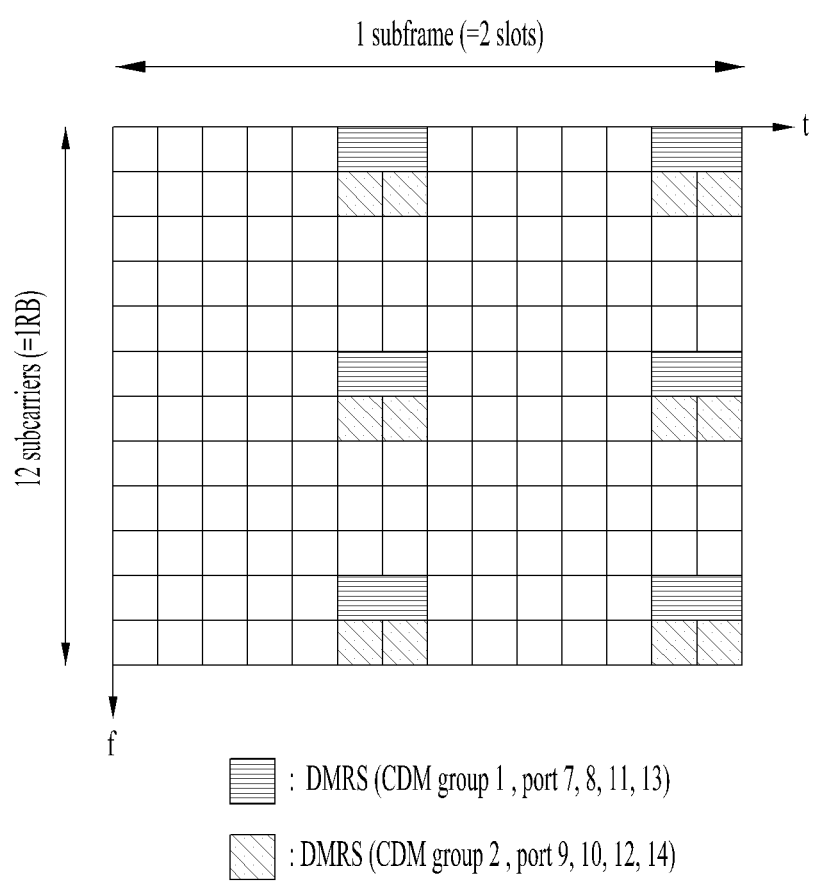
FIG. 8 is a conceptual diagram illustrating a Code Division Multiplexing (CDM) group.

The DMRS overhead aspect will hereinafter be described with reference to FIG. 8. FIG. 8 shows that DMRS is mapped to a subframe at each of antenna ports 7 to 14. As shown in FIG. 8, DMRS may be classified into CDM (Code Divisional Multiplexing) Group 1 and CDM Group 2 according to a resource-grid mapping position. In an RE corresponding to CDM Group 1, DMRS is transmitted through antenna ports 7, 8, 11, and 13. In an RE corresponding to CDM Group 2, DMRS is transmitted through antenna ports 9, 10, 12, and 14. That is, REs for DMRS transmission are identical to each other in an antenna port contained in one CDM group. Assuming that DMRS is transmitted only using the antenna port corresponding to CDM Group 1, the number of resource elements (REs) needed for DMRS is 12. That is, DMRS overhead is denoted by 12. Likewise, if the antenna port corresponding to CDM Group 2 is used, DMRS overhead is denoted by 24.

Coordinated Multi-Point (COMP)

According to the improved system performance requirements of the 3GPP LTE-A system, CoMP transmission/reception technology (what may be referred to as co-MIMO, collaborative MIMO or network MIMO) is proposed. The CoMP technology can increase the performance of a UE located at a cell edge and increase average sector throughput.

In general, in a multi-cell environment in which a frequency reuse factor is 1, the performance of the UE located at the cell edge and average sector throughput may be reduced due to Inter-Cell Interference (ICI). In order to reduce the ICI, in the existing LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, the ICI is preferably reduced or the UE reuses the ICI as a desired signal. In order to accomplish the above object, a CoMP transmission scheme may be applied.

The CoMP scheme applicable to downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by coordination of the cells of the CoMP unit.

In this CoMP system, multi-cell BSs (eNBs) can support data for a UE. In addition, the BSs (eNBs) support one or more UEs simultaneously in the same radio frequency resources, thereby increasing system performance. The BSs (eNBs) may also operate in Space Division Multiple Access (SDMA) mode based on CSI between a UE and the eNBs.

A serving BS (eNB) and one or more cooperative BSs (eNBs) are connected to a scheduler through a backbone network in the CoMP system. The scheduler may receive channel information about the channel states between a UE and the cooperative eNBs, measured by each cooperative BS (eNB) and operate based on the channel information. For example, the scheduler may schedule information for cooperative MIMO for the serving BS (eNB) and the one or more cooperative BSs (eNBs). That is, the scheduler may transmit a command directly to each eNB with regard to the cooperative MIMO operation.

As can be seen from the above description, it can be recognized that a CoMP system operates as a virtual MIMO system by grouping a plurality of cells into one group. Basically, the CoMP system adopts a MIMO communication scheme using multiple antennas.

Enhanced-PDCCH(EPDCCH)

In an LTE system after Release 11, enhanced-PDCCH (EPDCCH) is considered as a solution to lack of capacity of a PDCCH due to coordinated multi-point (CoMP), multi user-multiple input multiple output (MU-MIMO), and the like, and degradation of PDCCH performance due to inter-cell interference. In addition, channel estimation may be performed on an EPDCCH based on DMRSs contrary to the existing CRS-based PDCCH, in order to obtain a pre-coding gain. The above-mentioned DMRS may be referred to as "DMRS associated with EPDCCH", differently from DMRS (i.e., DMRS associated with PDSCH) used for channel estimation for PDSCH decoding.

The UE may perform blind decoding as in a legacy LTE/LTE-A system to receive/acquire DCI over an EPDCCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as a specific search space for the EPDCCH UE, and the search space may be set/configured for each aggregation level. In addition, the aggregation levels may be {1, 2, 4, 8, 16, 32} according to a type of a subframe, the length of a CP, and the amount of available resources in a PRB pair, which is much or little different from the case of a legacy LTE/LTE-A system.

For a UE having an EPDCCH configured, REs included in a PRB pair set are indexed by EREGs, and the EREGs are in turn indexed by ECCEs. EPDCCH candidates configuring the search space may be determined based on the indexed ECCEs and then blind decoding may be performed. Thereby, control information may be received. Herein, EREG corresponds to REG in the legacy LTE/LTE-A and ECCE corresponds to CCE in the legacy LTE/LTE-A. A PRB pair may include 16 EREGs.

EPDCCH transmission may be divided into localized EPDCCH transmission and distributed EPDCCH transmission according to configuration of a PRB pair used for EPDCCH transmission. Localized EPDCCH transmission represents a case in which ECCEs used for transmission of one DCI are adjacent to each other in the frequency domain, and specific precoding may be applied to obtain a beam-forming gain. For example, localized EPDCCH transmission may be based on consecutive ECCEs the number of which corresponds to an aggregation level. On the other hand, distributed EPDCCH transmission represents transmission of an EPDCCH in a separated PRB pair in the frequency domain, and has an advantage with regard to frequency diversity. For example, distributed EPDCCH transmission may be based on the ECCE having four EREGs (for example, if special subframe configuration (#1, #2, #6, #7, #9) and the extended CP are decided, 8 EREGs may be used) included in each PRB pair separated in the frequency domain.

One or at least two PRB-pair sets (EPDCCH PRB set) capable of being used as any one of localized EPDCCH transmission or distributed EPDCCH transmission may be configured in the UE. One EPDCCH PRB set may include N PRB pairs (where N=1, 2, 4, 8, or 16). Individual EPDCCH PRB sets may have different N values. The respective EPDCCH PRB sets may have overlapped PRB pairs. The EPDCCH PRB sets may be signaled to the UE. That is, the number (N) of PRB pairs constructing each EPDCCH PRB set may be signaled to the UE.

In this case, a self-blocking problem may occur from the viewpoint of each UE. The self-blocking problem may indicate that several EPDCCH candidates to be attempted for blind decoding by the UE are configured in the same resource, so that a total number of blind decoding attempts given to the UE may be substantially reduced.

The self-blocking problem may be caused by various methods for uniformly distributing EPDCCH candidates to the same resources. In more detail, various methods may be used as exemplary methods for distributing EPDCCH candidates. For example, there may be used a method for inserting an offset between the starting positions of EPDCCH candidates by adjusting parameters contained in the hashing function; and there may also be used a method for randomizing only the start position of a first EPDCCH candidate of each aggregation level using the hashing function, successively arranging the next EPDCCH candidates, and uniformly distributing actual EPDCCH candidates to the resources using the ECCE mapping so that the EPDCCH candidates can be uniformly mapped to the resources.

The following self-blocking methods (i) and (ii) may be used as detailed exemplary self-blocking methods. The self-blocking method (i) is a self-blocking method for use in one EPDCCH PRB set. The self-blocking method (ii) may be a self-blocking method used when different EPDCCH PRB sets are overlapped with each other. According to the self-blocking method (i), if there is a small number of PRB pairs contained in one EPDCCH PRB set, the EPDCCH candidate having the same aggregation level may correspond to the same resource. That is, if the position of an EPDCCH candidate derived through hashing or EPDCCH mapping deviates from the EPDCCH PRB set, this EPDCCH candidate may be mapped in the range from the beginning of the EPDCCH PRB set. In this case, the same resources as those of the EPDCCH candidate to which resources are allocated may be shared as necessary. According to the self-blocking method (ii), since the hashing function for use in each EPDCCH PRB set may be independently used, if the resource regions of different EPDCCH PRb sets overlap with each other in all or some parts, an exemplary case in which EPDCCH candidates contained in different EPDCCH PRB sets may share the same resources may occur.

Therefore, methods for solving the above-mentioned self-blocking will hereinafter be described in detail.

Embodiment 1

A first embodiment (Embodiment 1) is implemented by including the EPDCCH candidate index and/or the EPDCCH PRB set index in an equation for calculating a representative antenna port. The localized EPDCCH transmission method allocates one antenna port to each EPDCCH (or per DCI). That is, the localized EPDCCH transmission method is also, denoted by single antenna port transmission. In order to meet the above-mentioned requirements, the EPDCCH candidate having an aggregation level of 2 or higher may allow only one antenna port from among a plurality of antenna ports allocated to ECCEs contained in the corresponding EPDCCH candidate to be used as an antenna port of the corresponding EPDCCH candidate. (That is, it may be, appreciated that the above-mentioned one antenna port is used as a representative antenna port of the corresponding EPDCCH candidate, so that the above-mentioned one antenna port may be referred to as a representative antenna port. The representative antenna port may be decided by the following equation 4.) In more detail, when the UE performs blind decoding of the EPDCCH candidate for each aggregation level in one or more EPDCCH PRB set, at least one of the EPDCCH candidate index and the EPDCCH PRB set index may be used when the antenna, port (representative antenna port) related to the EPDCCH candidate is decided.

In this case, when using the equation for calculating a representative antenna port using the EPDCCH candidate index, different antenna ports are allocated to the same-level EPDCCH candidates sharing the same resources (using different beamforming methods in a spatial domain), so that the self-blocking operation can be prevented from occurring. In addition, the reason why the EPDCCH PRB set index is considered is that, when different EPDCCH PRB sets share a specific PRB pair and the same resources are allocated to the EPDCCH candidate of each EPDCCH PRB set, the corresponding resources can be extended to the spatial domain. In other words, the EPDCCH PRB set index is considered when the representative antenna port is decided, so that the same resources are not allocated to EPDCCH candidates of different EPDCCH PRB sets. That is, although different EPDCCH candidates share the same frequency/time resources, the number of EPDCCH candidates of the corresponding UE can be maintained on the condition that the use of different beamforming is allowed in the spatial domain.

The following equation 4 may be used to calculate the representative antenna port. As can be seen from Equation 4, one antenna port irrelevant to the aggregation level of the EPDCCH candidate may be decided.

$$n' = n_{ECCE,low} \bmod N_{RB}^{ECCE} n_{RNTI} \bmod \min(N_{EPDCCH}^{ECCE}, N_{RB}^{ECCE}) \quad \text{[Equation 4]}$$

In Equation 4, n' may denote a (representative) antenna port, and may be defined in the following Table 4. $n_{ECCE,low}$ may denote the lowest ECCE index from among ECCEs constructing the corresponding EPDCCH candidate within the corresponding EPDCCH set, $n_{RNTI}$ may denote a UE ID, $N_{ECCE}^{RB}$ may denote the number of ECCEs per resource block, and $N_{ECCE}^{EPDCCH}$ may denote an aggregation level.

TABLE 4

| | Normal CP | | |
|---|---|---|---|
| n' | Normal Subframe Special subframe configuration 3, 4, 8 | Special subframe configuration 1, 2, 6, 7, 9 | Extended CP All subframes |
| 0 | 107 | 107 | 107 |
| 1 | 108 | 109 | 108 |
| 2 | 109 | — | — |
| 3 | 110 | — | — |

If decision of the representative antenna port is executed by Equation 4, decision of the representative antenna port based on Embodiment 1 (i.e., decision of antenna port related to the EPDCCH candidate in which the EPDCCH candidate index ($idx_{can}$) is reflected) may be any one of Equations 5-1 to 5-3.

$$n' = (n_{ECCE,low} + idx_{can}) \bmod N_{ECCE}^{RB} + n_{RNTI} \bmod \min(N_{ECCE}^{EPDCCH}, N_{ECCE}^{RB}) \quad \text{[Equation 5-1]}$$

$$n' = n_{ECCE,low} \bmod N_{ECCE}^{RB} + (n_{RNTI} + idx_{can}) \bmod \min(N_{ECCE}^{EPDCCH}, N_{ECCE}^{RB}) \quad \text{[Equation 5-2]}$$

$$n' = (n_{ECCE,low} + idx_{can}) \bmod N_{ECCE}^{RB} + (n_{RNTI} + idx_{can}) \bmod \min(N_{ECCE}^{EPDCCH}, N_{ECCE}^{RB}) \quad \text{[Equation 5-3]}$$

When considering the EPDCCH PRB set index ($idx_{set}$), the antenna port related to the EPDCCH candidate may be any one of the following equations 6-1 to 6-3.

$$n' = (n_{ECCE,low} + idx_{set}) \bmod N_{ECCE}^{RB} + n_{RNTI} \bmod \min(N_{ECCE}^{EPDCCH}, N_{ECCE}^{RB}) \quad \text{[Equation 6-1]}$$

$$n' = n_{ECCE,low} \bmod N_{ECCE}^{RB} + (n_{RNTI} + idx_{set}) \bmod \min(N_{ECCE}^{EPDCCH}, N_{ECCE}^{RB}) \quad \text{[Equation 6-2]}$$

$$n' = (n_{ECCE,low} + idx_{set}) \bmod N_{ECCE}^{RB} + (n_{RNTI} + idx_{set}) \bmod \min(N_{ECCE}^{EPDCCH}, N_{ECCE}^{RB}) \quad \text{[Equation 6-3]}$$

When the representative antenna port is decided, the EPDCCH candidate index ($idx_{can}$) and the EPDCCH PRB set index ($idx_{set}$) are simultaneously considered, the antenna port related to the EPDCCH candidate may be any one of Equations 7-1 to 7-3.

$$n' = (n_{ECCE,low} + idx_{set} + idx_{can}) \bmod N_{ECCE}^{RB} + n_{RNTI} \bmod \min(N_{ECCE}^{EPDCCH}, N_{ECCE}^{RB}) \quad \text{[Equation 7-1]}$$

$$n' = n_{ECCE,low} \bmod N_{ECCE}^{RB} + (n_{RNTI} + idx_{set} + idx_{can}) \bmod \min(N_{ECCE}^{EPDCCH}, N_{ECCE}^{RB}) \quad \text{[Equation 7-2]}$$

$$n' = (n_{ECCE,low} + idx_{set} + idx_{can}) \bmod N_{ECCE}^{RB} + (n_{RNTI} + idx_{set} + idx_{can}) \bmod \min(N_{ECCE}^{EPDCCH}, N_{ECCE}^{RB}) \quad \text{[Equation 7-3]}$$

If the representative antenna port is decided by the following equation 8, the antenna port related to EPDCCH may be decided by any one of the following equations 9-1 to 9-3 according to the first embodiment (Embodiment 1).

$$RAP = 107 + (n_{eCCE} + idx_{can} + Y_k \bmod N) \bmod 4, \text{ (for normal CP)}$$

$$RAP = 107 + (n_{eCCE} + idx_{can} + Y_k \bmod N) \bmod 2, \text{ (for extended CP)} \quad \text{[Equation 8]}$$

In Equation 8, $n_{eCCE}$ may denote the lowest ECCE index from among ECCEs used for EPDCCH candidate contained in the PRB pair, $Y_k$ may denote a variable decided by C-RNTI and the subframe number (k), and RAP may denote a representative antenna port.

$$RAP = 107 + (n_{eCCE} + idx_{set} + Y_k \bmod N) \bmod 4, \text{ (for normal CP)}$$

$$RAP = 107 + (n_{eCCE} + idx_{set} + Y_k \bmod N) \bmod 2, \text{ (for extended CP)} \quad \text{[Equation 9-1]}$$

$$RAP = 107 + (n_{eCCE} + idx_{can} + Y_k \bmod N) \bmod 4, \text{ (for normal CP)}$$

$$RAP = 107 + (n_{eCCE} + idx_{can} + Y_k \bmod N) \bmod 2, \text{ (for normal CP)} \quad \text{[Equation 9-2]}$$

$$RAP = 107 + (n_{eCCE} + idx_{set} + idx_{can} + Y_k \bmod N) \bmod 4, \text{ (for normal CP)}$$

$$RAP = 107 + (n_{eCCE} + idx_{set} + idx_{can} + Y_k \bmod N) \bmod 2, \text{ (for extended CP)} \quad \text{[Equation 9-3]}$$

From among the above-mentioned equations, an equation for deciding the representative antenna port may be applied to the localized EPDCCH PRB set, and at least one of UE-configured EPDCCH PRB sets may be the EPDCCH PRb set for localized EPDCCH transmission, so that the UE-configured EPDCCH PRB sets can be applied to Equations of Embodiment 1.

Embodiment 2-1

If two or more EPDCCH candidates share the same resources, a representative antenna port linked (or allocated) to the corresponding ECCE in the order of ECCE indexes constructing the corresponding EPDCCH candidate may be pre-defined as a representative antenna port of the corresponding EPDCCH candidate. That is, from the EPDCCH candidate having a low index from among EPDCCH candidates sharing the same resources, the antenna ports allocated to ECCE having a low index may be set to representative antenna ports.

Figure 9:
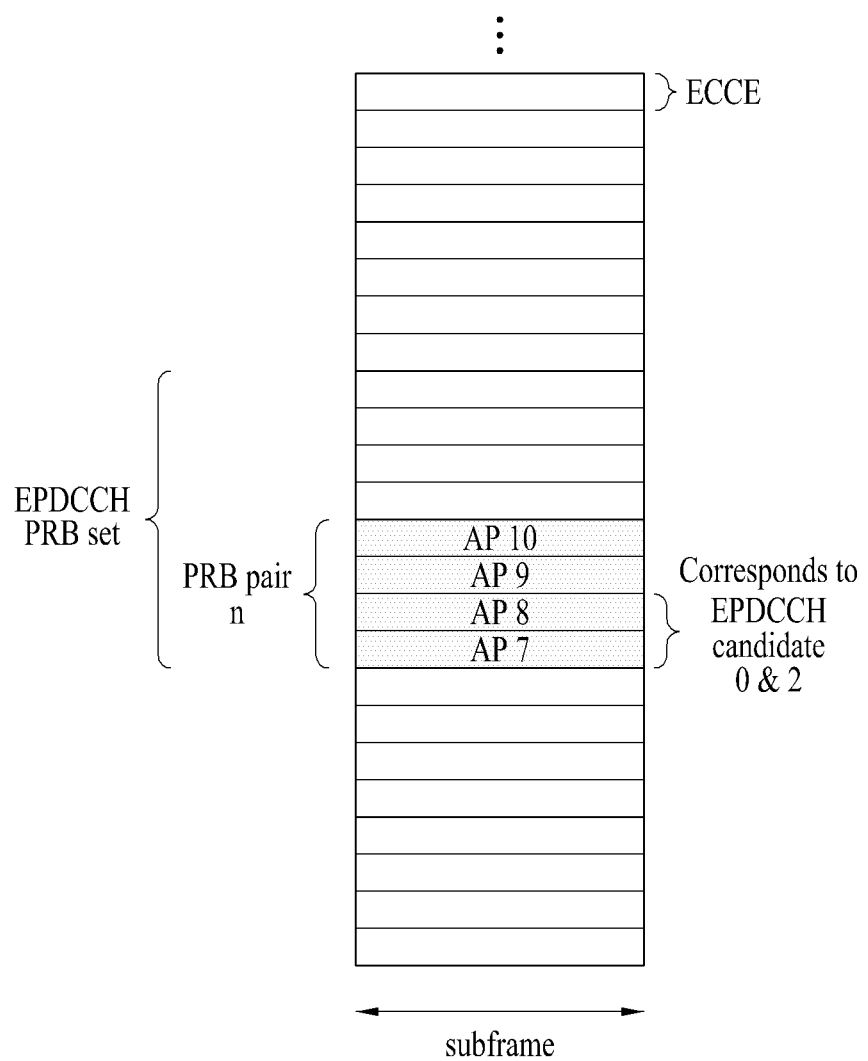
FIG. 9 is a conceptual diagram illustrating allocation of a representative antenna port allocation according to an embodiment of the present invention.

One example of Embodiment 2 is shown in FIG. 9. As can be seen from FIG. 9, at the PRB pair (n) of the EPDCCH PRB set, if EPDCCH candidate #0 and EPDCCH candidate #2 are allocated to the same resource (denoted by a hatched part), a representative antenna port of EPDCCH candidate #0 may be Antenna port #7 (AP 7), and a representative antenna port EPDCCH candidate #2 may be Antenna port #8 (AP 8).

Alternatively, the representative antenna port of EPDCCH candidate #0 is decided by Equation 4 or Equation 8, and EPDCCH candidate #0 and other antenna ports from among antenna ports allocated to ECCE contained in the corresponding EPDCCH candidate may be selected as the representative antenna port of EPDCCH candidate #2.

Embodiment 2-2

In Embodiment 1, if the EPDCCH candidate index or the EPDCCH PRB set index is a multiple of the aggregation level, the same antenna port may be selected again. Therefore, according to Embodiment 1, if at least two EPDCCH candidates correspond to one antenna port, and if the EPDCCH candidate index or the EPDCCH PRB set index is a multiple of the aggregation level, a representative antenna port may be determined according to Embodiment 2-1.

Embodiment 3

In Embodiment 3, the number of EPDCCH candidates for each AL to be blind-decoded for each EPDCCH PRB set is signaled through higher layer signaling. (If necessary, the start position of each EPDCCH candidate may be signaled.) This means that the BS (or network) allocates different numbers of EPDCCH candidates to individual EPDCCH PRB sets according to the N value, and the BS may, signal the number of EPDCCH candidates per EPDCCH PRB set in consideration of the self-blocking probability or the like.

As another method based on RRC signaling, a representative antenna port may be designated for RRC signaling. This method may be efficiently used when EPDCCH candidates contained in each AL share the same resources at AL2 or greater. The priority or the like for designating the representative antenna port may be configured as necessary. The order for configuring an AP for a first EPDCCH candidate and an AP for a second EPDCCH candidate in association with the same resources may be signaled.

Apparatus According to this Embodiment

Figure 10:
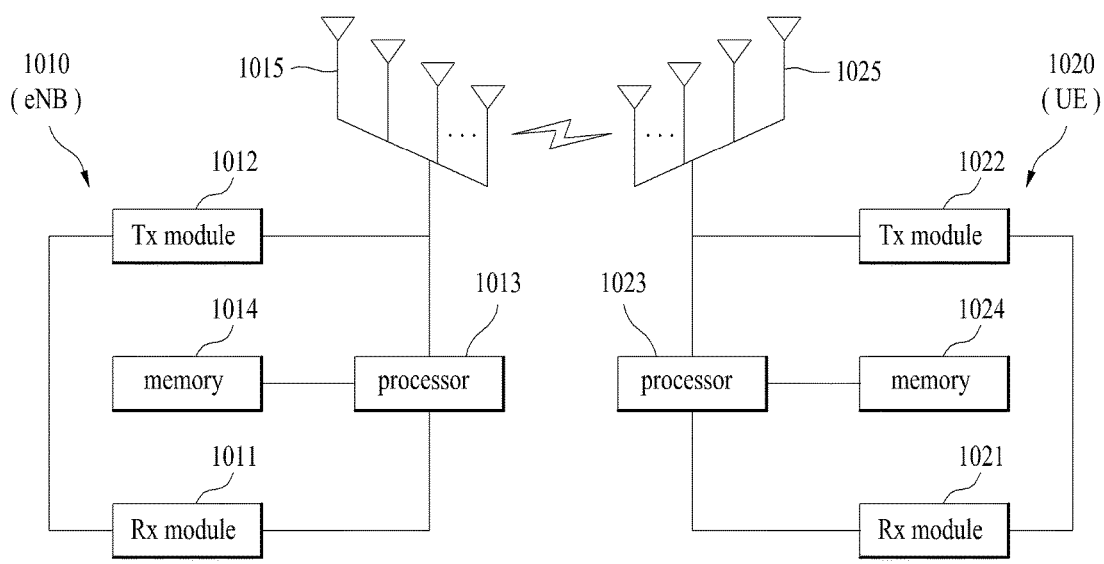
FIG. 10 is a block diagram illustrating a transceiver apparatus according to embodiments of the present invention.

FIG. 10 is a block diagram illustrating a transmission point apparatus and a UE apparatus according to embodiments of the present invention.

Referring to FIG. 10, the transmission point apparatus 1010 according to the present invention may include a reception (Rx) module 1011, a transmission (Tx) module 1012, a processor 1013, a memory 1014, and a plurality of antennas 1015. The plurality of antennas 1015 indicates a transmission point apparatus for supporting MIMO transmission and reception. The reception (Rx) module 1011 may receive a variety of signals, data and information on an uplink starting from the UE. The Tx module 1012 may transmit a variety of signals, data and information on a downlink for the UE. The processor 1013 may provide overall control to the transmission point apparatus 1010.

The processor 1013 of the transmission point apparatus 1010 according to one embodiment of the present invention can process the above-mentioned embodiments.

The processor 1013 of the transmission point apparatus 1010 processes information received at the transmission point apparatus 1010 and transmission information to be transmitted externally. The memory 1014 may store the processed information for a predetermined time. The memory 1014 may be replaced with a component such as a buffer (not shown).

Referring to FIG. 10, the UE apparatus 1020 may include an Rx module 1021, a Tx module 1022, a processor 1023, a memory 1024, and a plurality of antennas 1025. The plurality of antennas 1025 indicates a UE apparatus supporting MIMO transmission and reception. The Rx module 1021 may receive downlink signals, data and information from the BS (eNB). The Tx module 1022 may transmit uplink signals, data and information to the BS (eNB). The processor 1023 may provide overall control to the UE apparatus 1020.

The processor 1023 of the UE apparatus 1023 according to one embodiment of the present invention can process the above-mentioned embodiments.

The processor 1023 of the UE apparatus 1020 processes information received at the UE apparatus 1020 and transmission information to be transmitted externally. The memory 1024 may store the processed information for a predetermined time. The memory 1024 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 1010 shown in FIG. 10 may be applied to the eNB (BS), or may also be applied to a relay node (RN) acting as a DL transmission entity or UL reception entity without departing from the scope or spirit of the present invention. In addition, the description of the UE apparatus 1020 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may, use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for receiving a downlink signal through an Enhanced Physical Downlink Control Channel (EPDCCH) in a wireless communication system by a user equipment (UE), the method comprising:
   receiving one or more EPDCCH PRB (Physical Resource Block) sets; and
   performing blind decoding of an EPDCCH candidate for each aggregation level in the one or more EPDCCH PRB sets,
   wherein at least one of an EPDCCH candidate index and an EPDCCH PRB set index is used to determine an antenna port related to the EPDCCH candidate.

2. The method according to claim 1, wherein the one or more EPDCCH PRB sets include a localized EPDCCH PRB set.

3. The method according to claim 1, wherein a lowest enhanced control channel element (ECCE) index of the EPDCCH candidate, a user equipment identifier (UE ID), and a number of ECCEs for each resource block are used to determine the antenna port related to the EPDCCH candidate.

4. The method according to claim 1, wherein the antenna port related to the EPDCCH candidate is decided by any one of the following equations, $$n' = (n_{ECCE,low} + idx_{set}) \bmod N_{ECCE}^{RB} + n_{RNTI} \bmod \min(N_{ECCE}^{EPDCCH}, N_{ECCE}^{RB}),$$

$$n' = n_{ECCE,low} \bmod N_{ECCE}^{RB} + (n_{RNTI} + idx_{set}) \bmod \min(N_{ECCE}^{EPDCCH}, N_{ECCE}^{RB}), \text{ and}$$

$$n' = (n_{ECCE,low} + idx_{set}) \bmod N_{ECCE}^{RB} + (n_{RNTI} + idx_{set}) \bmod \min(N_{ECCE}^{EPDCCH}, N_{ECCE}^{RB}), \quad [\text{Equations}]$$

where, n' is a value for indicating the antenna port, $n_{ECCE,low}$ is a lowest enhanced control channel element (ECCE) index from among ECCEs constructing the EPDCCH candidate contained in an EPDCCH set, $n_{RNTI}$ is a user equipment identifier (UE ID), $N_{ECCE}^{RB}$ is a number of ECCEs per resource block, $N_{ECCE}^{EPDCCH}$ is an aggregation level, and $idx_{set}$ is the EPDCCH PRB set index.

5. The method according to claim 1, wherein the antenna port related to the EPDCCH candidate is decided by any one of the following equations, $$n' = (n_{ECCE,low} + idx_{can}) \bmod N_{ECCE}^{RB} + n_{RNTI} \bmod \min(N_{ECCE}^{EPDCCH}, N_{ECCE}^{RB}),$$

$$n' = n_{ECCE,low} \bmod N_{ECCE}^{RB} + (n_{RNTI} + idx_{can}) \bmod \min(N_{ECCE}^{EPDCCH}, N_{ECCE}^{RB}), \text{ and}$$

$$n' = (n_{ECCE,low} + idx_{can}) \bmod N_{ECCE}^{RB} + (n_{RNTI} + idx_{can}) \bmod \min(N_{ECCE}^{EPDCCH}, N_{ECCE}^{RB}), \quad [\text{Equations}]$$

where, n' is a value for indicating the antenna port, $n_{ECCE,low}$ is a lowest enhanced control channel element (ECCE) index from among ECCEs constructing the EPDCCH candidate contained in an EPDCCH set, $n_{RNTI}$ is a user equipment identifier (UE ID), $N_{ECCE}^{RB}$ is a number of ECCEs per resource block, $N_{ECCE}^{EPDCCH}$ is an aggregation level, and $idx_{can}$ is the EPDCCH candidate index.

6. The method according to claim 1, wherein the antenna port related to the EPDCCH candidate is decided by any one of the following equations, $$n' = (n_{ECCE,low} + idx_{set} + idx_{can}) \bmod N_{ECCE}^{RB} + n_{RNTI} \bmod \min(N_{ECCE}^{EPDCCH}, N_{ECCE}^{RB}),$$

$$n' = n_{ECCE,low} \bmod N_{ECCE}^{RB} + (n_{RNTI} + idx_{set} + idx_{can}) \bmod \min(N_{ECCE}^{EPDCCH}, N_{ECCE}^{RB}), \text{ and}$$

$$n' = (n_{ECCE,low} + idx_{set} + idx_{can}) \bmod N_{ECCE}^{RB} + (n_{RNTI} + idx_{set} + idx_{can}) \bmod \min(N_{ECCE}^{EPDCCH}, N_{ECCE}^{RB}) \quad [\text{Equations}]$$

where, n' is a value for indicating the antenna port, $n_{ECCE,low}$ is a lowest enhanced control channel element (ECCE) index from among ECCEs constructing the EPDCCH candidate contained in an EPDCCH set, $n_{RNTI}$ is a user equipment identifier (UE ID), $N_{ECCE}^{RB}$ is a number of ECCEs per resource block, $N_{ECCE}^{EPDCCH}$ is an aggregation level, $idx_{can}$ is the EPDCCH candidate index, and $idx_{set}$ is the EPDCCH PRB set index.

7. The method according to claim 4, wherein:
   if n' is 0, 1, 2, or 3, n'=0 indicates an antenna port #107, n'=1 indicates an antenna port #108, n'=2 indicates an antenna port #109, or n'=3 indicates an antenna port #110.

8. The method according to claim 1, wherein the number of antenna ports related to the EPDCCH candidate is set to 1, irrespective of an aggregation level.

9. The method according to claim 1, wherein the EPDCCH candidate index or the EPDCCH PRB set index do not correspond to a multiple of the aggregation level.

10. The method according to claim 1, wherein:
    if the EPDCCH candidate index or the EPDCCH PRB set index is a multiple of the aggregation level, and if at least two EPDCCH candidates correspond to one antenna port, antenna ports related to the at least two EPDCCH candidates are differently determined.

11. The method according to claim 10, wherein the antenna port related to the at least two EPDCCH candidates is determined to be an antenna port allocated to an enhanced control channel element (ECCE) in the order of ECCE indexes corresponding to the EPDCCH candidates.

12. The method according to claim 1, wherein the one or more EPDCCH PRB sets are indicated through higher layer signaling.

13. A user equipment (UE) device for receiving a downlink signal through an Enhanced Physical Downlink Control Channel (EPDCCH) in a wireless communication system, the UE device comprising:
- a receiver configured to receive signals; and
- a processor configured to process the signals,
- wherein the processor configures to control the receiver to receive one or more EPDCCH PRB (Physical Resource Block) sets, and configures to perform blind decoding of an EPDCCH candidate for each aggregation level in the one or more EPDCCH PRB sets, and
- wherein at least one of an EPDCCH candidate index and an EPDCCH PRB set index is used to determine an antenna port related to the EPDCCH candidate.

14. A method for receiving a downlink signal through an Enhanced Physical Downlink Control Channel (EPDCCH) in a wireless communication system by a user equipment (UE), the method comprising:
- receiving one or more EPDCCH PRB (Physical Resource Block) sets; and
- performing blind decoding of an EPDCCH candidate for each aggregation level in the one or more EPDCCH PRB sets,
- wherein a lowest enhanced control channel element (ECCE) index of the EPDCCH candidate, a user equipment identifier (UE ID), and a number of ECCEs for each resource block are used to determine the antenna port related to the EPDCCH candidate.

* * * * *